F. S. McWHORTER.

Grain Weighing Machines.

No. 5,337. Reissued March 25, 1873.

Francis S. McWhorter
by his Attys.
Howson and Son.

WITNESSES. John K. Rupertus.
Harry Smith

THE NORRIS PETERS CO., PHOTO-LITHO., WASHINGTON, D. C.

UNITED STATES PATENT OFFICE.

FRANCIS S. McWHORTER, OF ST. GEORGE'S, DELAWARE.

IMPROVEMENT IN GRAIN-WEIGHING MACHINES.

Specification forming part of Letters Patent No. 83,298, dated October 20, 1868; reissue No. 5,337, dated March 25, 1873.

*To all whom it may concern:*

Be it known that I, F. S. McWHORTER, of St. George's, county of New Castle, State of Delaware, have invented an Improved Machine for Weighing and Tallying Grain, of which the following is a specification:

The main object of my invention is to rapidly and accurately weigh grain, and to register the quantity weighed, and this object I attain by mechanism which I will now proceed to describe.

Figure 1:
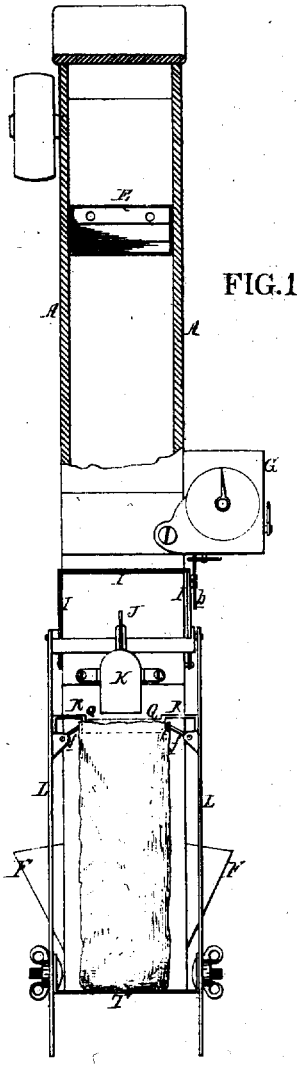
Figure 2:
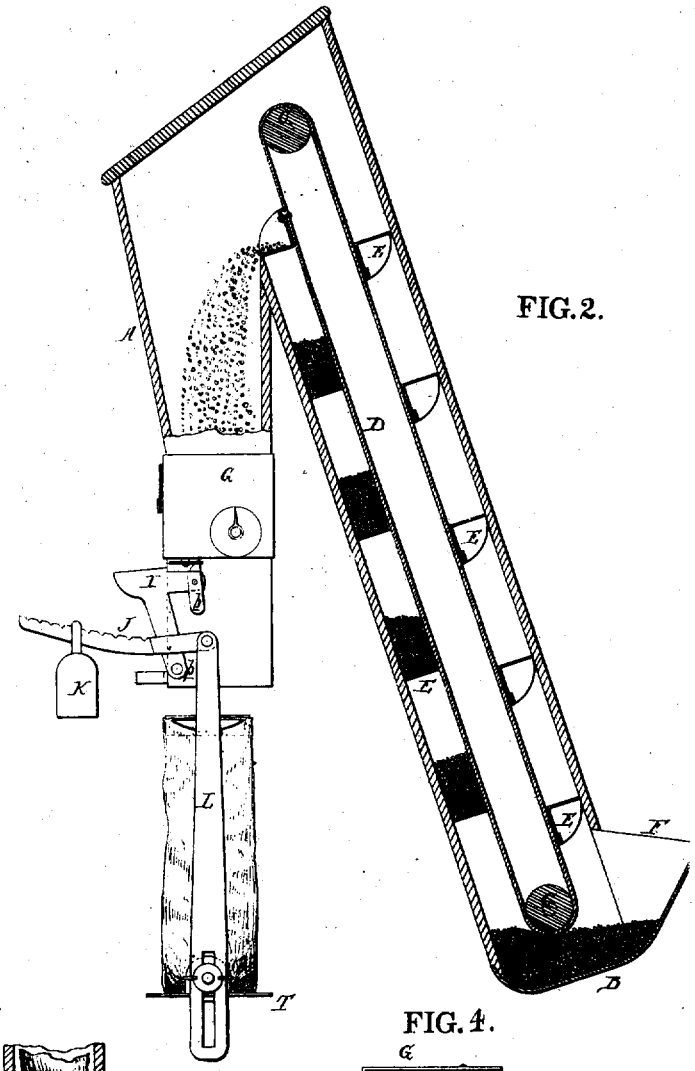
Figure 3:
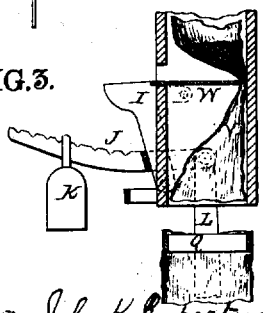
Figure 5:
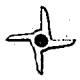
Figure 4:
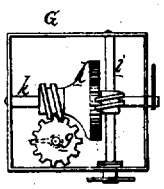

Figure 1 is a front view of the machine partly in section; Fig. 2, a side view of the same with part of the side removed to illustrate the interior; Fig. 3, a vertical section of part of the machine; Fig. 4, a view illustrating the registering mechanism; Fig. 5, a view of the wheel forming part of the registering device.

The grain leaving the thrashing-machine, or derived from any other source, falls through a hopper, F, into the lower end of an inclined box or chamber, B, and is carried upward within the latter by buckets E attached to an endless band, D, passing round pulleys C C, one of which should be driven at a uniform speed by any suitable appliances. The grain is discharged by the buckets into a spout, A, and falls thence through a sleeve, V, of any suitable fabric, so secured to the inside of the spout that it will readily yield to the pressure imparted by a transverse slide, W, and become closed by the same, thereby preventing the further escape of grain from the spout under the circumstances explained hereafter. (See Fig. 3.) The slide W is attached to or forms part of arms I I connected to the spout, one to each side of the same by pins *p*. The arms I I are rigidly connected to the forked portion of a steelyard, J, this forked portion passing partly around the spout and being jointed to the upper ends of the suspension-bars L L, the latter being connected together near their lower ends by a transverse plate, T, on which the sack to receive the grain rests. The weight K is adjusted on the graduated steelyard to accord with the weight of the grain which the sack is intended to receive, and as long as the grain in the sack does not overbalance this weight it will continue to flow through the sleeve in the spout, for the slide W acted on by the weighted steelyard is maintained by the latter so far away from the sleeve that the grain can flow freely through the same.

When the desired weight of grain, however, has been received by the sack, the latter with the bars L L will descend, moving the steelyard on its fulcrum-pins *p*, and at the same time causing the slide W to compress the sleeve, as shown in Fig. 3, thereby preventing the further escape of grain from the spout A.

Inasmuch as the steelyard vibrates on a fulcrum which is a considerable distance below the point at which the sack is suspended, there is such an increase of leverage and consequent increase of power as the bag descends as insures the prompt and effective action of the cut-off.

The accumulation of grain in the spout above the sleeve has no tendency to thrust the slide outward, for the sleeve is of such flexible material that the weight of the grain will be supported by the slide, and even tend to retain the latter in the position it has been moved by the descent of the sack. When the loaded sack has been removed the weighted end of the steelyard will descend, and consequently the slide W will be moved outward, and the sleeve being uninfluenced by it will expand and permit the grain to pass into another sack which has been placed on the cross-plate T.

The registering or tallying mechanism is contained within the casing G, and consists of a shaft, *i*, carrying a worm which gears into a wheel, *h*, on the shaft *k*, the latter having a pointer on the outside of the casing, and also having a worm which gears into a wheel, *g*, on a shaft, which also carries a pointer on the outside of the casing, the two pointers in conjunction with properly-graduated dial-plates determining the number of sacks loaded and weighed by the machine. This registering mechanism is operated through the action of a weighted catch, *b*, pivoted to one of the arms I, on a cog-wheel, Fig. 5, attached to the shaft *i*. When the arm I moves outward from the spout the beveled end of the catch-lever escapes the wheel by turning on its pivot; but the lever is so weighted that after passing the wheel it recovers its former vertical position, so that on the return movement of the arm toward the spout it will strike a tooth of the wheel and turn the same, a lug on the arm I preventing the catch-lever from yielding during this movement. The bottom or cross-plate T is connected to the suspension-bars L L by bolts passing through slots in the said bars, so that the cross-piece can be readily adjusted vertically to suit sacks of different lengths. Q is a rectangular band situated between the suspending-bars L L, to which projections R R on the said band are secured. The mouth of the sack is placed over this band and held to the same by dogs *f f*, one of which is pivoted to each suspension-bar, the dogs serving to jam the edge of sack against the band Q when a downward pressure is exerted on the sack, the dogs being readily lifted and the mouth of the sack withdrawn from the band when the said sack has to be removed to make way for another.

I claim as my invention—

1. The combination of a steelyard, carrying a grain-receptacle, with a flexible sleeve, V, and with the mechanism described, or its equivalent, for arresting the passage of grain through the sleeve on the descent of the receptacle.

2. The within-described arresting device, consisting of a flexible sleeve contained within the spout A and a slide, W, or its equivalent.

3. The sack-holder, consisting of bars L L and cross-plate T suspended from the steelyard, as set forth.

4. The cross-plate T, rendered adjustable vertically on the suspension-bars of the sack-holder, as and for the purpose specified.

5. The within-described retainer for the mouth of the sack, consisting of the bars Q and dogs *f* combined with the suspension-bars, all substantially as set forth.

In testimony whereof I have signed my name to this specification in the presence of two subscribing witnesses.

FRANCIS S. McWHORTER.

Witnesses:
WM. A. STEEL,
HUBERT HOWSON.